May 21, 1929.  G. R. CADWALLADER  1,713,511
TIRE CASING SPREADER
Filed April 9, 1927  4 Sheets-Sheet 1

Inventor
G.R.Cadwallader
By Robert Cobb
Attorneys

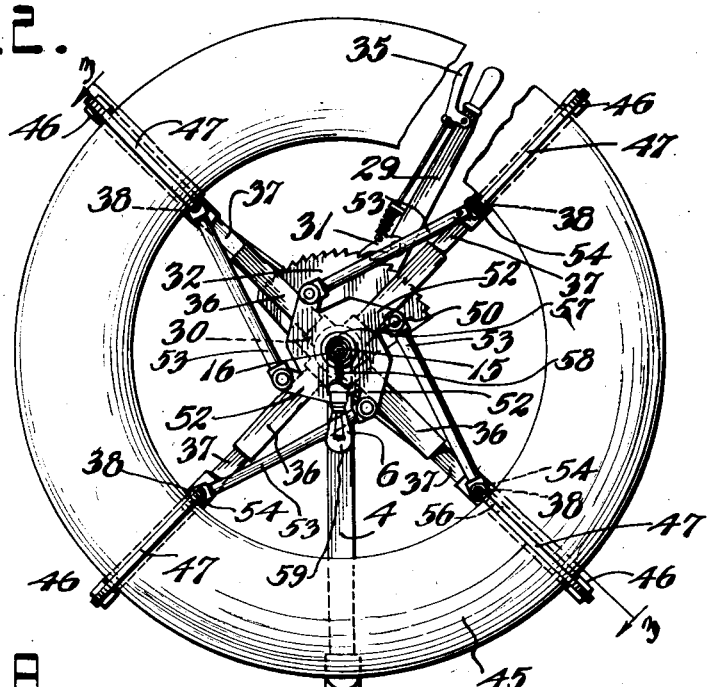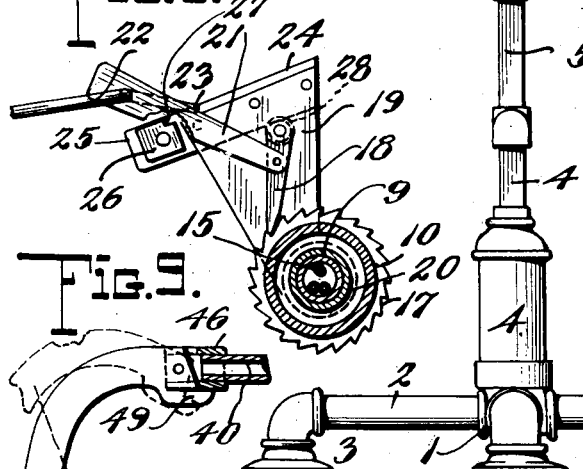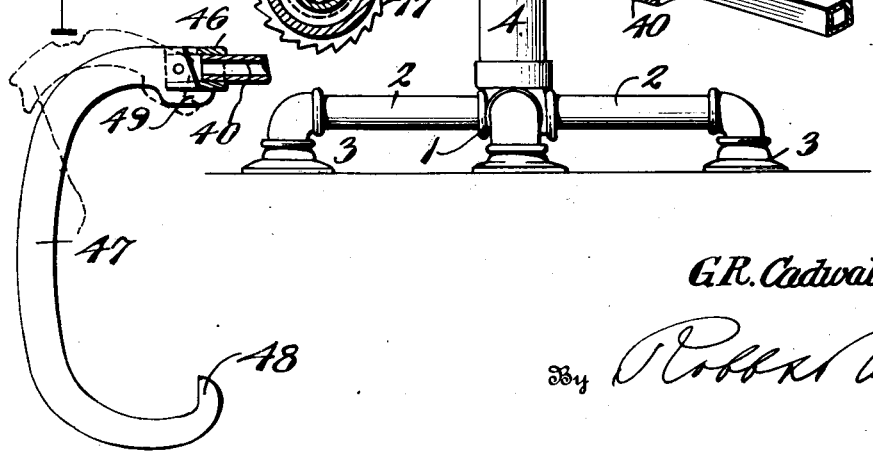

May 21, 1929.  G. R. CADWALLADER  1,713,511
TIRE CASING SPREADER
Filed April 9, 1927   4 Sheets-Sheet 3
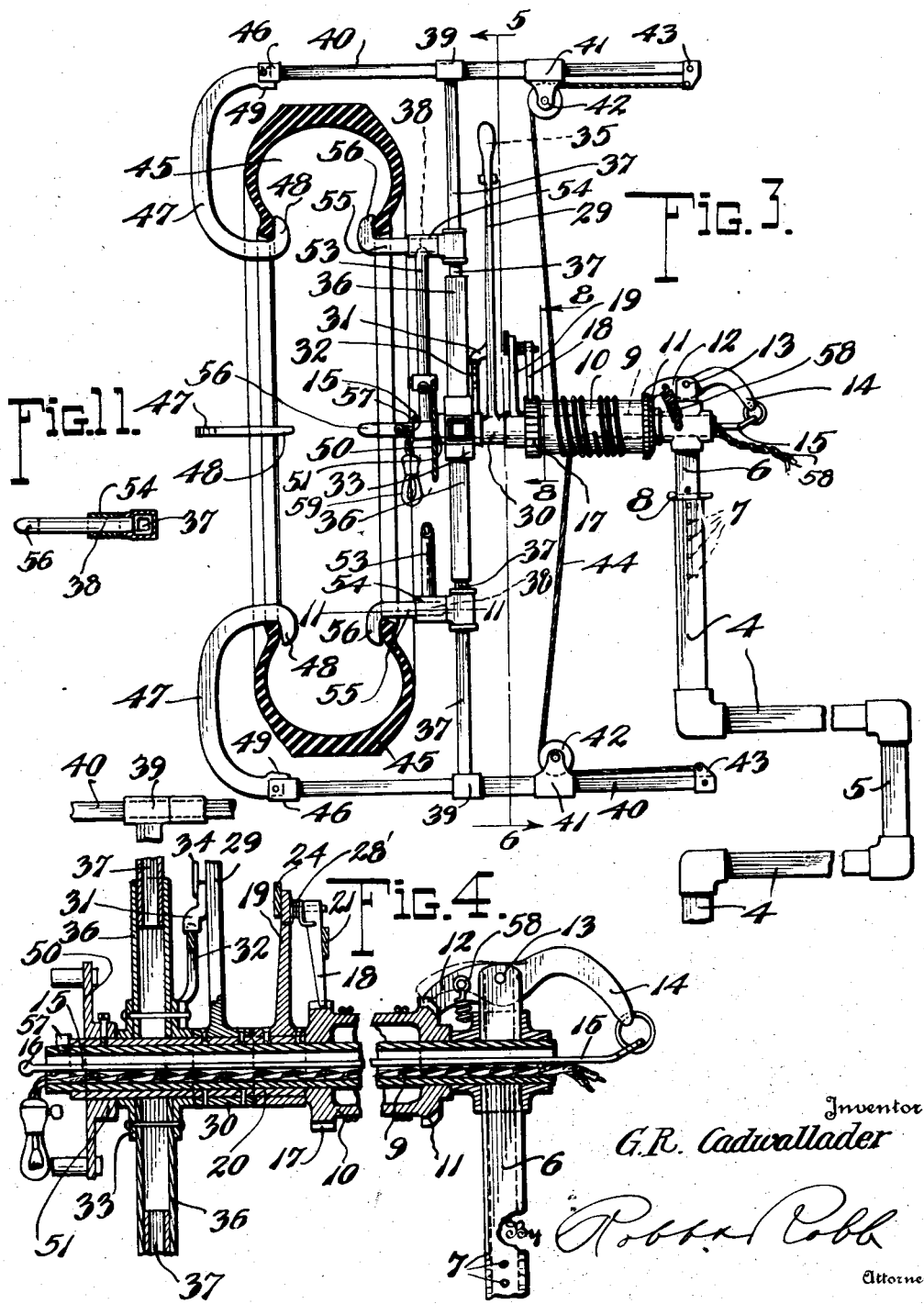

May 21, 1929.  G. R. CADWALLADER  1,713,511
TIRE CASING SPREADER
Filed April 9, 1927    4 Sheets-Sheet 4
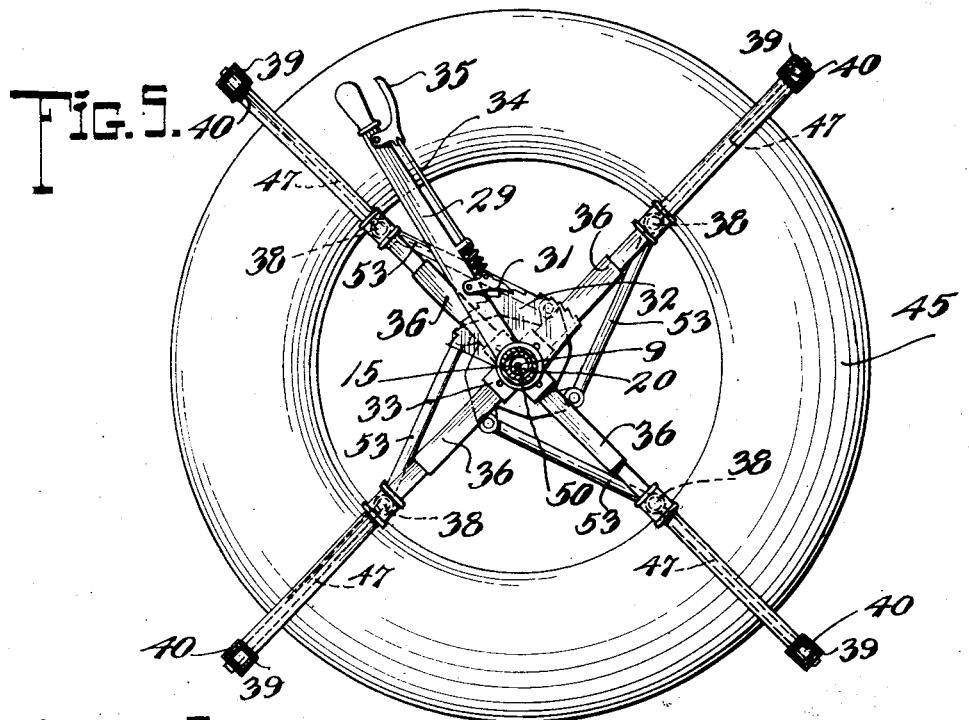
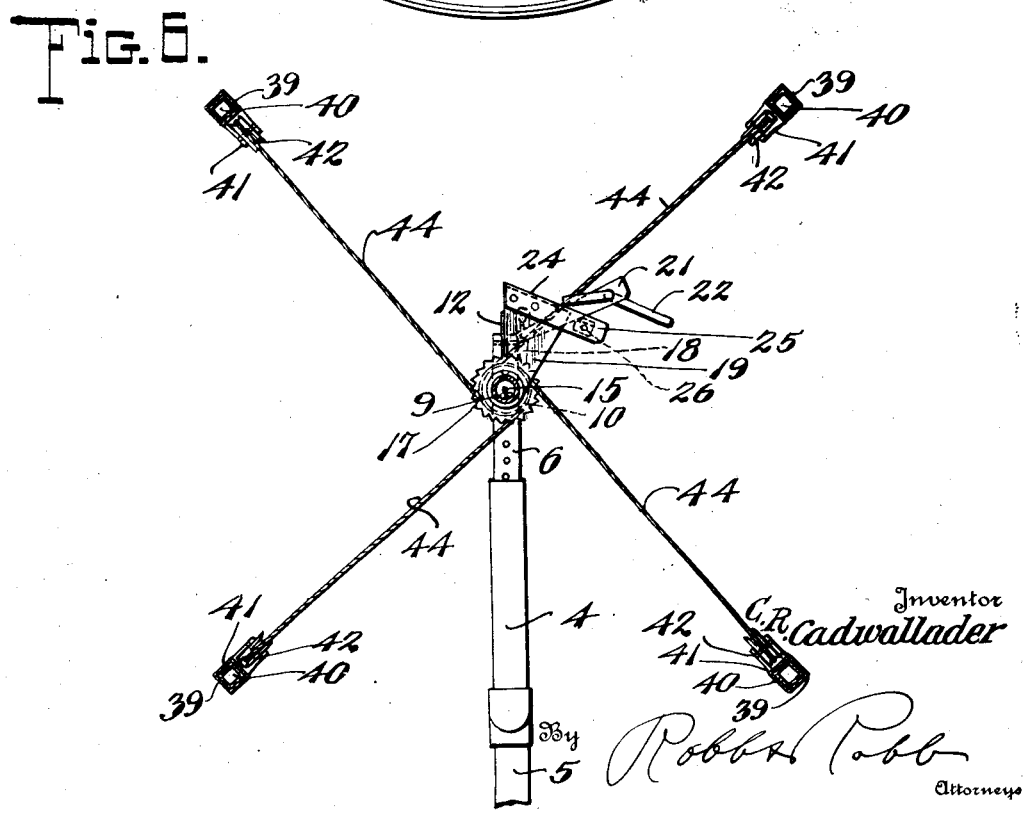

Patented May 21, 1929.

1,713,511

UNITED STATES PATENT OFFICE.

GEORGE R. CADWALLADER, OF LAKEWOOD, OHIO.

TIRE-CASING SPREADER.

Application filed April 9, 1927. Serial No. 182,363.

This invention relates to improvements in apparatus for facilitating manipulation, treatment and inspection of elastic casings such as the shoes of automobile tires, and commonly referred to as tires.

The primary object in view is the positioning and control of parts of such a casing in an easy and facile manner.

A further object is the ready manipulation and effective retention of the adjusting parts in given positions.

With these and further objects in view, as will in part hereinafter become apparent, and in part be stated, the invention comprises a support, tire-margin engaging means sustained thereby and means for adjusting said engaging means both axially and radially relative to a tire casing.

The invention comprises also means for retaining said engaging means in their respective adjusted positions while permitting bodily movement of a casing for facilitating inspection, repair or other treatment of the casing.

The invention also comprises certain other novel constructions, including a tire holding means with devices operated by rotating the holding means to thereby spread the tire.

In the accompanying drawings:—

Figure 2 is a front elevation thereof.

Figure 3 is a vertical, longitudinal section taken substantially on the plane indicated by line 3—3 of Figure 2, parts being seen in elevation.

Figure 4 is a similar vertical section taken substantially on the plane of the axis of the supporting shaft for the tire engaging members, parts being seen in elevation.

Figures 5 and 6 are vertical, sections taken transversely of the shaft of the tire engaging means, the parts in Figure 5 being seen by looking toward the tire casing, and the parts in Figure 6 being seen by looking in the opposite direction, that is toward the standard, the section being taken on the plane indicated by line 5—6 of Figure 3.

Figure 7 is an enlarged detailed section through one of the supporting sleeves and slide bars for an outer engaging hook.

Figure 8 is a detailed sectional elevation of the drum detent mechanism, the section being taken on the plans indicated by line 8—8 of Figure 3, looking in the direction indicated by the arrows, parts in the rear being omitted to avoid confusion.

Figure 9 is a sectional elevation of one of the outer hooks and its articulation.

Figure 11 is a detail sectional view taken approximately on the line 11—11 of Figure 3.

Figure 1:
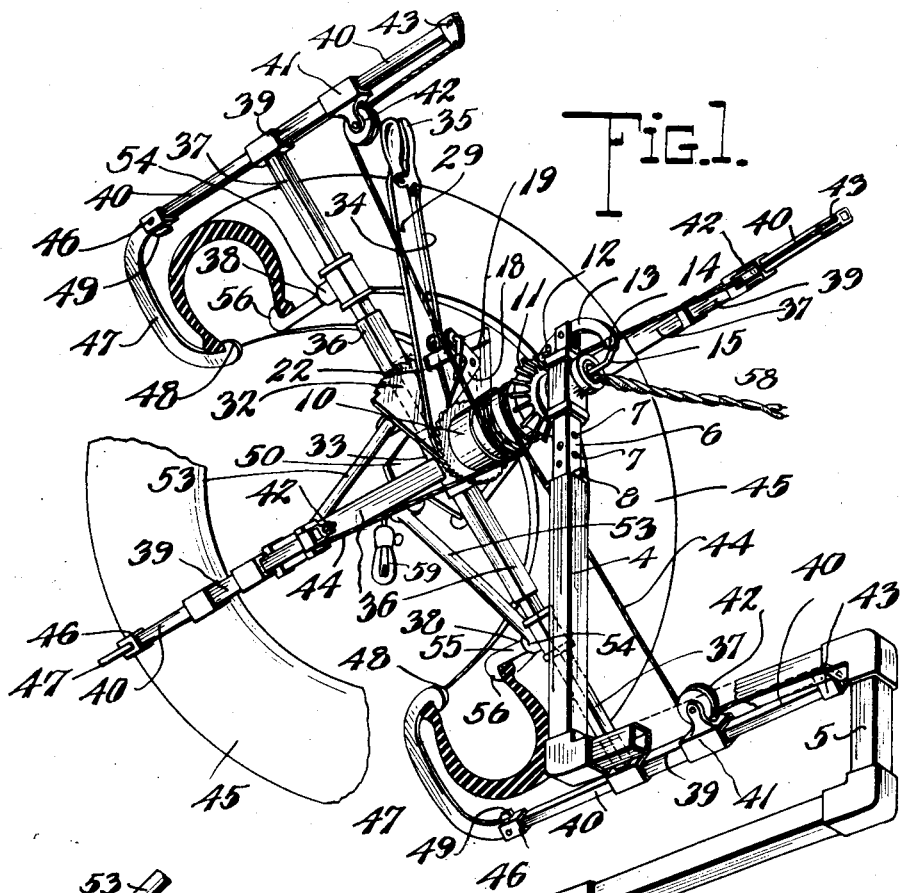
Figure 1 is a perspective of an apparatus embodying the features of the present invention.
Figure 10:
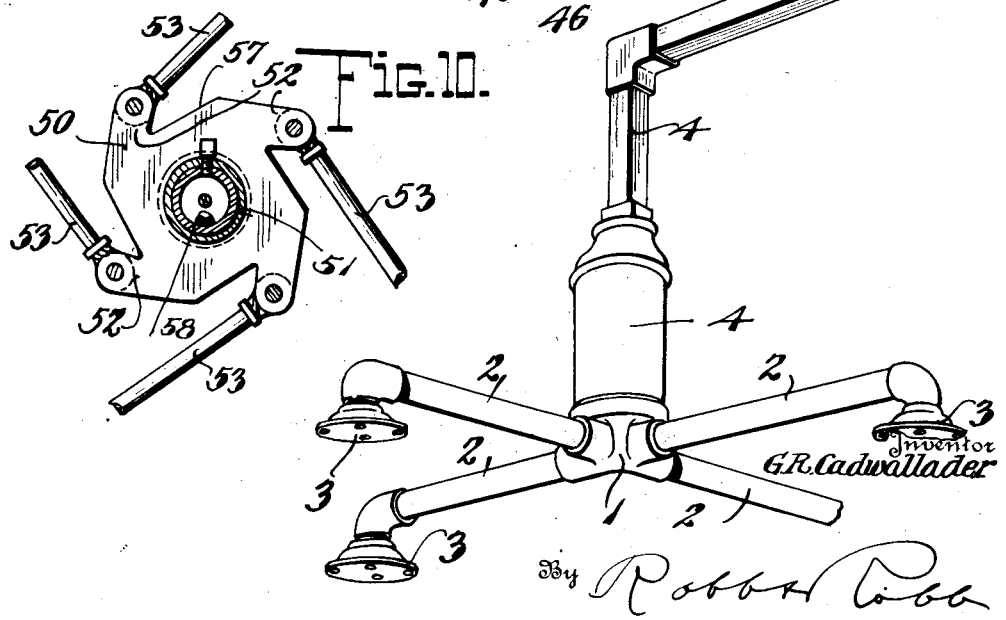
Figure 10 is an enlarged, fragmentary end view, parts in the rear being omitted.

Referring to the drawings by the numerals, any appropriate support is provided, such as that illustrated in the accompanying drawings, in which 1 indicates a base made up in any appropriate manner, such for example as by being formed of radial arms 2 terminating in anchoring plates 3 adapted to be bolted or otherwise effectively connected to the floor or other support. Upstanding from the base 1 is a standard 4 of appropriate material and of any required contour, it being preferably provided with an offset portion 5 for accommodating movements of operating parts. At the upper extremity of the standard 4, a longitudinally vertically adjustable section 6 is preferably provided for facilitating vertical adjustment of the parts carried by said section. The adjustable section 6 may be sustained at any desired point of adjustment in any of various ways, such for example as the provision of apertures 7 formed in the section 6 and adapted to receive a supporting pin 8 disposed to rest on the main portion of the standard 4. The section 6 is preferably square or otherwise poly-sided to prevent rotation thereof relative to the standard 4.

Fixed to and outstanding horizontally from the upper portion of the section 6 is a shaft 9 on which the revolubly mounted parts of the apparatus are carried. Journaled on the shaft 9 and having one end adjacent the standard section 6 is a drum 10 about which cables 44 are adapted to be reeled, the inner end of each cable being fixed to the drum. For facility of indicating direction, the direction toward the standard 4 will be referred to as inward and the opposite direction as outward. With this understanding, the inner end of drum 10 is provided with a circular rack 11 engaged by locking pawl 12. The rack 11 may be merely a bevel gear or any other appropriately toothed ring fixed to the drum 10 and designed to serve as means for locking the drum against rotation about the shaft 9. The pawl 12 is pivoted at 13 to the upper extremity of section 6 and carries an operating finger 14 pivoted to the end of a rod 15 which extends throughout and axially of the shaft 9, said shaft being tubular, the outer or remote end portion of the rod 15 being provided with an operating handle 16 located to facilitate manipulation by one standing in position outward of the tire casing mounted on the machine. The opposite or outer end of the drum 10 from that carrying rack 11 is provided with a similar locking rack 17, fixed to the drum and located to engage a detent pawl 18 pivoted to a radially extending arm 19. The arm 19 is fixed in any appropriate manner to a sleeve 20 which is rotatably mounted on the shaft 9 outward of the outer end of drum 10. A bracket plate 21 is fixed to and outstands from the pawl 18 and at its outer portion is penetrated by an operating lever 22 having an offset or crank terminal portion 23 disposed to engage and rest on the upper or outer edge of bracket 19 when the pawl 18 is in engagement with the rack 17. A plate 24 is fixed to the outer portion of bracket arm 19 and extends beyond one edge of the arm as at 25. To the extension 25 is pivoted a block 26 having a notch 27 located to provide a seat for the end of the crank 23 when the crank is moved beyond engagement with the outer edge of bracket arm 19. Thus by swinging the lever 22, the crank 23 may be moved into engagement with the notch 27, and thereby the bracket plate 21 is elevated or shifted sufficiently for moving the pawl 18 out of engagement with the rack 17, and the seating of the end of the crank 23 in the notch 27 will cause the parts to remain in the position with the pawl 18 out of engagement with the rack 17. Reverse movement of lever 22, allowing the crank arm 23 to move back to its at rest position on the edge of bracket arm 19 will restore the pawl 18 to its engagement with the rack 17. The pawl 18 is engaged by a spring 28 coiled about the pivot of the pawl 18 and connected at one end to the pawl and at the other end to the bracket arm 19 and tensioned to stress the pawl 18 toward the position in engagement with the rack 17.

An operating lever 29 is fixed to the sleeve 20 as by having its inner end formed with a collar 30 encircling the sleeve and secured thereto by a set screw, pins or otherwise, as desired. The lever 19 extends outward substantially radially from the sleeve 20 and is provided with the usual detent pawl 31 engaging a segmental rack or quadrant 32, the quadrant being fixed to a hub 33 journaled on the sleeve 20. The usual link 34 and manually operated lever 35 is arranged along the lever 29 and spring stressed for retaining the pawl 31 in its engagement with the rack or quadrant 32, the parts being adapted to be operated for releasing the pawl and allowing the lever 29 to be swung independently of the hub 33.

Outstanding from the hub 33 are radial arms 36 in any desired or preferable number, four being illustrated for purposes of demonstrating a preferred embodiment of construction. Each of the arms 36 is preferably tubular and squared or otherwise poly-sided to receive a radial reciprocal rod 37 similarly squared so that the rod 37 in each instance may move longitudinally in a direction toward or away from the shaft 9 but may not axially revolve. Extending laterally from each rod 37 beyond the respective arm 36, the rod is provided with an outstanding wrist pin or bearing member 38, the said wrist pin thus extending parallel to the axis of the shaft 9. Each rod 37 extends beyond the place of the respective wrist pin 38 and at its outer extremity is provided with a sleeve 39 arranged with the axis of the sleeve parallel to the axis of shaft 9. Each sleeve 39 is preferably squared or poly-sided in cross-section, and slidingly extending through each sleeve is a similarly cross sectioned bar 40, so that each bar 40 is free to slide lengthwise through the respective sleeve 39 but retained against angular movement or rotation therein.

The sleeve 39 extends forwardly beyond the place of engagement with the bar 37 and carries a bracket 41 which is preferably bifurcated and a grooved pulley 42 is journaled between the furcations of the bracket 41. A bracket 43 is fixed to the inner free end of each rod 40, and a cable 44 is fixed to the free end of each bracket 43 and laced about the respective pulley 42 and extends thence radially inward to and has its inner end portion fixed to the drum 10 for enabling the cable to be reeled upon the drum when the parts are revolved, as aforesaid.

The outer portion of each bar or rod 40 beyond the respective sleeve 39 extends a sufficient distance to project past the tire casing 45 to be operated upon and is formed with a bifurcated end 46 in which is pivoted the hook 47 terminating in a tire bead engaging finger 48. The pivoted end of each hook 47 is provided with a lateral extension 49 disposed to engage or abut against the base or inner end of the slot formed by the bifurcation 46 whereby the hook 47 is allowed a limited amount of pivotal play relative to the bar 40, and the extent of such play will be limited by contact from the projection 49 with the parts engaged.

As seen in Figures 2 and 3, just forward of the hub 33, is a crank wheel 50 having a hub 51 fixed to the sleeve 20. The crank wheel 50 may assume almost any contour so long as it provides the requisite crank arms for imparting angular motion from the sleeve 20 in the form of radial thrusts to the rods 37 and their connected parts. To this end, the wheel 50 is preferably in the form of a web provided with outstanding fingers 52 to each of which is pivoted a link 53. Each link 53 in turn extends to the respective wrist pin 38 and is provided with a sleeve 54 snugly surrounding the respective wrist pin 38. Each wrist pin 38 extends through its respective sleeve 54 and beyond the same and forming an extension bar 55 turned to provide a tire bead engaging finger 56 at its outer extremity. Thus, a finger 56 is arranged immediately opposite each finger 48 across the tire casing 45.

The several parts mounted to rotate on the shaft 9 are retained against outward axial movement by a pin 57 or other appropriate retaining device engaging the outward extremity of the shaft 9.

In operation, one of the essential functions of the apparatus is to support a tire casing and open it by engagement with the marginal beads or free edges of the tire casing and movement of such beads apart so that the casing is spread and held in a manner to permit free access to the interior for purposes of inspection, cleansing, repair, and other manipulation. To this end, it is desirable not only to retain the casing in an open condition but to support it in a manner permitting it to be freely revolved while retained open so that all parts may be examined and treated with equal facility.

The proper manipulation of the machine includes all of these desirable results and one operation may be stated to consist of the placing of the tire casing on the several hooks 47 and bars 55 with the several fingers 48 and 56 respectively in engagement with the inner surface of the marginal beads. It is, of course, well understood by those familiar with the art, that the marginal beads of a tire casing tend to remain so close together when free from a rim and not held by spreading apparatus that access to the interior of the casing is rendered difficult. The several fingers 48 and 56 will have to therefore be adjusted as near together as required for easy mounting of the tire casing in the position last stated before the mounting operation is begun. When said fingers have been thus disposed, it is a comparatively easy matter to apply the tire casing to the fingers, and then the mechanism is manipulated to open the tire. Such manipulation consists in moving the hooks 47 and the bars 55 radially outward to a firm engagement with the margins of the tire casing so that the marginal beads thereof may not escape from the fingers 47 and 56 during the balancing of the operation. After this has been done, the fingers 47 and 56 are moved axially apart and thereby spread the casing. To accomplish these results, the radial movement is effected by swinging of the lever 29 while holding hub 33 against rotation, which effects an angular advance of the sleeve 20 and proportionally oscillates the crank wheel 50 and delivers a proportional substantially radial thrust to the links 53 which becomes a radial thrust as imparted to the rod 37 and parts connected thereto. Thus the bars 55 are moved radially apart as are the hooks 47 until the casing 45 is effectively gripped. When this has been accomplished, the movement of the lever 29 ceases, and the pawl 31 engaging the rack of quadrant 32 prevents a return movement or relaxing movement of the parts. The operator then rotates the tire and the several radial arms 36 and parts connected thereto, the sleeve 20 rotating with the parts about the shaft 9, and the said parts therefore retaining the relations stated so far as the radial spacing of the fingers 48 and 56 and parts carrying the same, are concerned. The drum 10, however, being engaged by the detent 12, remains stationary so that, as the other parts revolve, the several cables 44 begin to wrap about the drum 10 and are thus taken up. As the cables 44 are taken up, they exert a longitudinal pull on the several sliding bars 40, thrusting the said bars longitudinally outward and pulling the several fingers 48 proportionally outward. This outward pull of fingers 48 causes the spreading action of the casing 45 since the fingers 56 remain stationary during the outward movement of the rods 40. It should be understood that during this winding up movement of the cables 44 on the drum 10 which gives the desired outward thrust to the rods 40, the pawl 18 is in engagement with the rack 17 and clicks past the several teeth thereof to insure against any return or relaxing rotation relative to drum 10. Thus, when the casing 45 has been spread to the required extent, the continued engagement of the pawl 18 with rack 17 retains the cables 44 tensioned in the given position with the casing 45 spread. Then if it is desired to inspect more than one place or to otherwise treat more than one place of the casing 45, the operator grasps the little handle 16 and pulls it outward which effects an outward movement of the rod 15 and a releasing swing of the pawl 12. As soon as pawl 12 escapes from rack 11, the whole mechanism journaled on the shaft 9 is free to revolve about the said shaft without altering the relative location of any of the parts. A spring 58 stresses the pawl 12 toward a seating position, and the operator therefore retains his hold on the handle 16 while he revolves the mechanism and the casing 45 until his inspection is completed and he has reached the point where he desires to treat the casing in any given way. At this point, he may release the handle 16 and allow the pawl 12 to drop back into engagement with rack 11 and thereby lock the tire in the given position. Thus the tire is held in the most desirable location for whatever treatment may be required. It will be seen that during the revolving movement, some or perhaps all of the rods 40 may pass through the opening provided by the offset 5, the said offset thus allowing the casing supporting mechanism to be located as near the center of gravity as is practicable without interfering with the operation of the parts.

After the work has been completed on the casing 45 and it is desired to release the same, the operator swings the lever 22 from the position seen in full lines in Figure 6, where the pawl 18 is in engagement with rack 17, to the position indicated in dotted lines in said figure where the pawl has been elevated out of engagement with said rack 17. The drum 10 will be held against rotation by the pawl 12, and the operator rotates the casing, the hub 33 and the connected parts in the opposite direction from the former direction of rotation, whereby the cables 44 are unwrapped from the drum 10. As this unwrapping process progresses, the casing 45 has its marginal portions moved toward each other by the tension of the casing itself and this action of the casing serves to pull the hooks 47 inward, sliding the rods or bars 40 along through the sleeves 39 to the former position. As soon as the casing 45 has been fully relaxed in this direction, the operator grasps the lever 29 and, by releasing latch 31, allows the lever to move in a reverse direction to its former movement, whereby the crank wheel 50 withdraws or pulls inward on the links 53, whereby the fingers 56 and bars 55 are withdrawn radially from engagement with the inner marginal bead of casing 45, and the fingers 48 are likewise moved radially inward out of engagement with the outer marginal bead of the casing. The casing is then free to be moved out of engagement with the machine. The pivot of each hook 47 to its respective rod 40 enables the hook to be swung freely away from the casing 45 when withdrawing the casing or when applying the same.

Electric wiring 58 is preferably laced through the tubular axle or fixed shaft 9 and carries or is electrically connected with a light 59 arranged to supply light for facilitating inspection and repair or other manipulation of the tire casing 45.

Having thus described my invention, what I claim as new and desire to secure by Letters Patent of the United States, is:—

1. In mechanism of the class described, the combination with a support, of a hub revolubly carried by the support, tire casing engaging fingers movably carried by the hub, means movable relative to the hub for shifting the fingers to the tire casing opening position, and a single means for locking all the parts in position retaining the tire casing open while leaving the hub and its engaged parts free to rotate.

2. In apparatus of the class described, the combination of a support, tire casing engaging means rotatably carried thereby, means for shifting the tire casing engaging means to a position opening the said casing, means for locking the parts in said open position while leaving the parts free to rotate about said support, and means for locking the parts against rotation.

3. In apparatus of the class described, the combination, with the support, of tire casing engaging means rotatably carried thereby and adapted to engage a tire at a plurality of places, an actuator for moving the tire casing engaging means to an opening position, and means for locking said actuator in the open position of the tire casing engaging means while leaving the parts free to revolve.

4. In apparatus of the class described, the combination, with the support, of tire casing engaging means rotatably carried thereby and adapted to engage a tire at a plurality of places, an actuator for moving the tire casing engaging means to an opening position, means for locking said actuator in the open position of the tire casing engaging means while leaving the parts free to revolve, and means for locking the parts against rotation.

5. In mechanism of the class described, the combination, with a support, of a hub rotatably carried thereby, crank means connected to move with the hub, links pivoted to be thrust by the crank means, rods actuated by the links, tire casing engaging means carried by said rods adapted to be moved radially to and from a tire casing margin engaging position, and means for moving the tire casing engaging means axially relative to the tire casing for opening the same.

6. In mechanism of the class described, the combination, with a support, of a hub rotatably carried thereby, crank means connected to move with the hub, links pivoted to be thrust by the crank means, rods actuated by the links, tire casing engaging means carried by said rods adapted to be moved radially to and from a tire casing margin engaging position, and means adapted to be actuated by rotation of the hub for shifting the tire casing engaging means axially for opening the tire casing.

7. In mechanism of the class described, the combination, with a support, of a hub rotatably carried thereby, crank means connected to move with the hub, links pivoted to be thrust by the crank means, rods actuated by the links, tire casing engaging means carried by said rods adapted to be moved radially to and from a tire casing margin engaging position, means adapted to be actuated by rotation of the hub for shifting the tire casing engaging means axially for opening the tire casing, and means for locking the tire casing engaging means in the spreading position while leaving the parts free to rotate.

8. In mechanism of the class described, the combination, with a support, of a hub rotatably carried thereby, crank means connected to move with the hub, links pivoted to be thrust by the crank means, rods actuated by the links, tire casing engaging means carried by said rods adapted to be moved radially to and from a tire casing margin engaging position, means adapted to be actuated by rotation of the hub for shifting the tire casing engaging means axially for spreading a tire casing, means for locking the tire casing engaging means in the spreading position while leaving the parts free to rotate, and means for releasably locking the parts against rotation.

9. In apparatus of the class described, the combination, with a support, and a shaft substantially and outstanding therefrom, of a drum journaled on the support, tire casing engaging means rotatably carried by the shaft and shiftable axially thereof for opening a tire casing, and cable means engaging the drum, and the tire casing engaging means, for shifting the latter by the pull of the cable means when being wrapped about the drum.

10. In apparatus of the class described, the combination, with a support and a shaft outstanding therefrom, of a drum rotatably mounted on the support, tire casing engaging means rotatably carried by the shaft and shiftable axially for opening a tire casing, cable means engaging the drum, tire casing engaging means, means for shifting the latter when the cable means is wrapped about the drum, the cable means and drum being adapted to be moved relative to each other for effecting the wrapping of the cable means about the drum, and means for locking the cable means and drum against relative movement.

11. In apparatus of the class described, the combination, with a support and a shaft outstanding therefrom, of a drum rotatably mounted on the support, tire casing engaging means rotatably carried by the shaft and shiftable axially for opening a tire casing, cable means engaging the drum, tire casing engaging means, means for shifting the latter when the cable means is wrapped about the drum, the cable means and drum being adapted to be moved relative to each other for effecting the wrapping of the cable means about the drum, means for locking the cable means and drum against relative movement, and means for detachably locking the drum against rotation.

12. In mechanism of the class described, the combination, with a support, of a hub revolubly mounted thereon, arms extending substantially radially from the hub, rods shiftable longitudinally of the hub, tire casing engaging means carried by the rods, means for shifting the rods longitudinally for varying the radial location of the tire casing engaging means, and means actuated incident to rotation of the hub for moving some of the tire casing engaging means axially relative to other of the tire casing engaging means.

13. In mechanism of the class described, the combination, with a support, of a hub revolubly mounted thereon, arms extending substantially radially from the hub, rods shiftable longitudinally of the arms, tire casing engaging means carried by the rods, means for shifting the rods longitudinally for varying the radial location of the tire casing engaging means, rods shiftably carried by the first mentioned rods for moving some of the tire casing engaging means axially relative to others thereof, and means actuated by the rotation of the hub for shifting the last mentioned rods.

14. In apparatus of the class described, the combination of a rotatably mounted hub, a sleeve extending through the hub, a lever engaging the sleeve to shift the sleeve angularly relative to the hub, means for locking the lever and hub together, radially movable rods carried by the hub, means actuated by the lever for shifting said rods radially, and tire casing manipulating means carried by the rods.

15. In apparatus of the class described, the combination of a rotatably mounted hub, a sleeve extending through the hub, a lever engaging the sleeve to shift the sleeve angularly relative to the hub, means for locking the lever and hub together, radially movable rods carried by the hub, means actuated by the lever for shifting said rods radially, tire casing manipulating means carried by the rods, some of said tire casing manipulating means being shiftably carried by said rods, and means for shifting the last mentioned tire casing engaging means.

16. In apparatus of the class described, the combination, with a support and a shaft outstanding therefrom, of a drum rotatably carried by the shaft, a sleeve rotatably mounted on the shaft, a hub rotatably mounted on the sleeve, an operating lever fixed to the sleeve, means for detachably locking the lever to the hub, a crank wheel fixed to the sleeve, radially shiftable rods carried by the hub, a wrist pin extending laterally from each of said rods, a link connecting each wrist pin to a part of the crank wheel, means for engaging and manipulating the inner margin of a tire casing extending from said rods, means for engaging and manipulating the outer margin of a tire casing slidingly engaging said rods, and cables for actuating the slidingly mounted engaging means extending to and engaging the drum for being manipulated thereby.

17. In apparatus of the class described, the combination, with a support and a shaft outstanding therefrom, of a drum rotatably carried by the shaft, a sleeve rotatably mounted on the shaft, a hub rotatably mounted on the sleeve, an operating lever fixed to the sleeve, means for detachably locking the lever to the hub, a crank wheel fixed to the sleeve, radially shiftable rods carried by the hub, a wrist pin extending laterally from each of said rods, a link connecting each wrist pin to a part of the crank wheel, means for engaging and manipulating the inner margin of a tire casing extending from said rods, means for engaging and manipulating the outer margin of a tire casing slidingly engaging said rods, cables for actuating the slidingly mounted engaging means extending to and engaging the drum for being manipulated thereby, and means for locking the drum against rotation independently of the hub.

18. In tire-casing handling apparatus, in combination, a rotatably mounted tire-casing support, and means actuated by rotation thereof for spreading a tire casing.

19. In tire-casing handling apparatus, in combination, a rotatably mounted tire-casing support, means actuated by rotation thereof for spreading a tire casing, and means for locking the tire-casing support in the tire spreading condition.

20. In tire-casing handling apparatus, in combination, means for spreading and movably sustaining a tire casing, and mechanism operating said spreading means by movement of a tire casing engaging said means.

21. In apparatus of the class described, the combination, of a support, tire casing engaging means rotatably carried by said support, means for shifting the tire casing engaging means to a position opening said casing, a single means for locking all the parts in said open position while leaving the parts free to rotate about said support, and a single means for locking all of said parts against rotation.

22. In tire casing handling apparatus, in combination, a tubular support, a tire casing support rotatably mounted on said tubular support, and means actuated by rotation of the rotatable support for spreading a tire casing, the tubular support being adapted to accommodate a source of light.

In testimony whereof I affix my signature.

GEORGE R. CADWALLADER.